US012528558B2

(12) United States Patent
Wei (10) Patent No.: US 12,528,558 B2
(45) Date of Patent: Jan. 20, 2026

(54) BICYCLE HEADSET (71) Applicant: TIEN HSIN INDUSTRIES CO., LTD., Taichung (TW)

(72) Inventor: Wei-Chih Wei, Taichung (TW)

(73) Assignee: TIEN HSIN INDUSTRIES CO., LTD., Taichung (TW)

(*) Notice: Subject to any disclaimer, the term of this patent is extended or adjusted under 35 U.S.C. 154(b) by 432 days.

(21) Appl. No.: 18/143,605

(22) Filed: May 5, 2023

(65) Prior Publication Data

US 2024/0286704 A1 Aug. 29, 2024

(30) Foreign Application Priority Data

Feb. 23, 2023 (TW) ................. 112106754

(51) Int. Cl.
*B62K 21/10* (2006.01)
*B62K 21/18* (2006.01)

(52) U.S. Cl.
CPC .............. *B62K 21/10* (2013.01); *B62K 21/18* (2013.01)

(58) Field of Classification Search
CPC ......... B62K 21/10; B62K 21/18; B62K 21/06
See application file for complete search history.

(56) References Cited

U.S. PATENT DOCUMENTS

| 5,496,126 | A | * | 3/1996 | Lin | ........................ | B62K 21/18 |
| | | | | | | 403/373 |
| 5,775,709 | A | * | 7/1998 | Chen | ...................... | B62K 21/06 |
| | | | | | | 384/538 |
| 10,421,517 | B2 | * | 9/2019 | Coaplen | ................. | B62K 19/32 |
| 12,337,923 | B2 | * | 6/2025 | King | ........................ | B62J 11/13 |
| 2022/0371683 | A1 | * | 11/2022 | Wei | ......................... | B62K 21/18 |

* cited by examiner

*Primary Examiner* — Alentin Neacsu
*Assistant Examiner* — Marlon A Arce
(74) *Attorney, Agent, or Firm* — Apex Juris, pllc; Hilde M. L. Coeckx (57) ABSTRACT

A bicycle headset includes a first casing and a second casing for being engaged with a head tube and a fork of a bicycle, respectively. The first casing has an axial direction. A bearing abuts between the first casing and the second casing. A first restricting member, having a first restricting surface, is connected to the second casing to rotate along with the second casing. A second restricting member, having a second restricting surface, is connected to the first casing. The restricting members move away from or toward each other in the axial direction. An elastic member abuts between the first casing and the second restricting member or between the second casing and the first restricting member and provides a force in the axial direction for urging one of the restricting members to move toward the other to allow the two restricting surfaces abut against each other, thereby forcing the fork to steer back.

16 Claims, 13 Drawing Sheets

BICYCLE HEADSET

BACKGROUND OF THE INVENTION

Technical Field

The present disclosure relates generally to a device of a bicycle, and more particularly to a bicycle headset that could assist a fork of a bicycle to steer back after the bicycle fork is turned.

Description of Related Art

Generally, a conventional structure for guiding a bicycle stem to steer back sets a spring between a fork and a frame of a bicycle. When the bicycle stem is turned to drive the fork to pull the spring, the spring could provide a resilience for the turned bicycle stem to steer back.

Although the conventional structure for guiding the bicycle stem to steer back could provide the resilience for making the turned bicycle stem returned, the spring is exposed outside, so that the conventional structure is easily damaged upon collision and is easily failed due to accumulated dirt.

BRIEF SUMMARY OF THE INVENTION

As a conventional structure for guiding a bicycle stem to steer back is exposed outside, the conventional structure is easily damaged upon collision and is easily failed. In view of the above, the primary objective of the present disclosure is to provide a structure designed for a bicycle, wherein the structure could generate a resilience for steering back after the fork of the bicycle is turned and could be mounted in the bicycle without being exposed outside, thereby assisting the bicycle fork to steer back after the bicycle fork is turned.

The present disclosure provides a bicycle headset including a first casing, a second casing, a bearing, a first restricting member, a second restricting member, and an elastic member. The first casing is adapted to be engaged with a head tube of a bicycle, has an axial direction, and is disposed with a first abutting surface. The second casing is adapted to be engaged with the fork of the bicycle and has a second abutting surface. Two different side surfaces of the bearing abut against the first abutting surface and the second abutting surface, respectively. The first restricting member is connected to the second casing and is rotated as the second casing is rotated. An end surface of the first restricting member away from the second casing in the axial direction has a first restricting surface.

The second restricting member is connected to the first casing, wherein an end surface of the second restricting member away from the first casing in the axial direction has a second restricting surface. Either the second restricting member or the first restricting member is movable in the axial direction for moving away from or toward the other. The elastic member abuts between the first casing and the second restricting member or between the second casing and the first restricting member, thereby providing a force in the axial direction for urging either the first restricting member or the second restricting member to move toward the other, making the first restricting surface abut against the second restricting surface. Either the first restricting surface or the second restricting surface has at least one projection, and the other correspondingly has at least one recess matching with the at least one projection.

Upon using the bicycle headset of the present disclosure, the first casing is engaged with the head tube of the bicycle, and the second casing is engaged with the fork of the bicycle, wherein at least a portion of the first casing enters the fork of the bicycle.

When the fork of the bicycle drives the second casing and the first restricting member connected to the second casing to rotate, the at least one projection and the at least one recess are misaligned with the other due to the rotation and the elastic member is compressed. A resilience of the elastic member could provide the force in the axial direction for urging either the first restricting member or the second restricting member to move toward the other, thereby making the second restricting member and the first restricting member get close to each other in the axial direction and returning the at least one projection to be aligned with the at least one recess. In this way, the first restricting member and the second casing tend to steer back after being driven by the fork of the bicycle to rotate. Therefore, the bicycle headset of the present disclosure could drive the fork of the bicycle to steer back after being rotated and could provide the resistance for the fork of the bicycle to rotate, so that the fork of the bicycle could be guided to steer back.

With the aforementioned design, at least a portion of the first casing of the bicycle headset enters the head tube of the bicycle, and the structures disposed in the first casing are not exposed outside, so that the structures disposed in the first casing could be prevented from being damaged due to collision or from being dirtied by mud or soil. Additionally, the fork of the bicycle could be guided to steer back, thereby preventing a potential danger caused by oversteering of the fork of the bicycle during riding the bicycle.

BRIEF DESCRIPTION OF THE SEVERAL VIEWS OF THE DRAWINGS

The present disclosure will be better understood by referring to the following detailed description of some illustrative embodiments in conjunction with the accompanying drawings, in which.

DETAILED DESCRIPTION OF THE INVENTION

A bicycle headset 100 according to a first embodiment of the present disclosure is illustrated in FIG. 1 to FIG. 3, FIG. 7, and FIG. 8, is adapted to be mounted between a head tube 92 and a fork 94 of a bicycle 90, and includes a first casing 10, a second casing 20, a bearing 30, a first restricting member 40, a second restricting member 50, and an elastic member 60.

Figure 1:
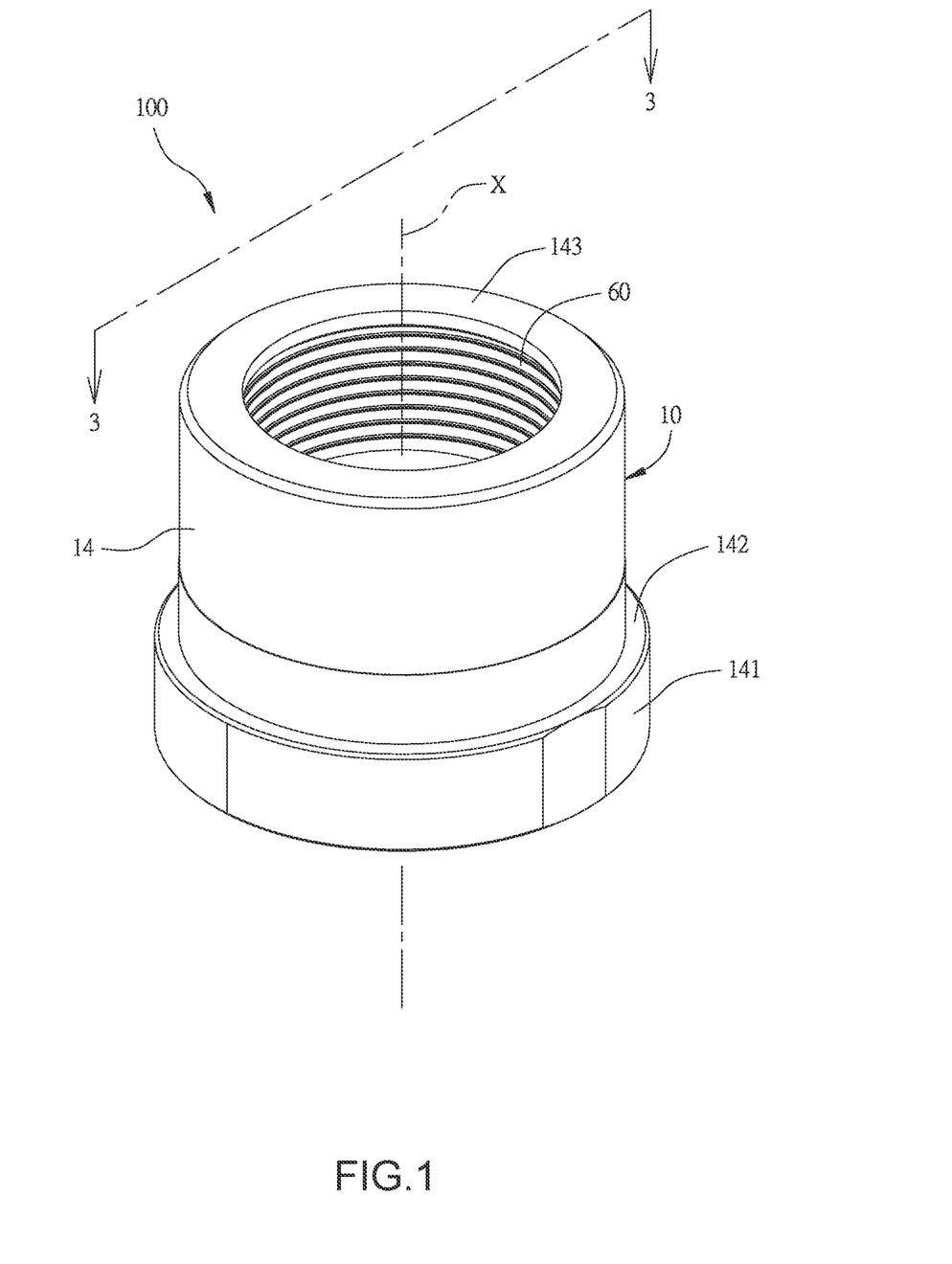
FIG. 1 is a perspective view of the bicycle headset according to a first embodiment of the present disclosure.
Figure 2:
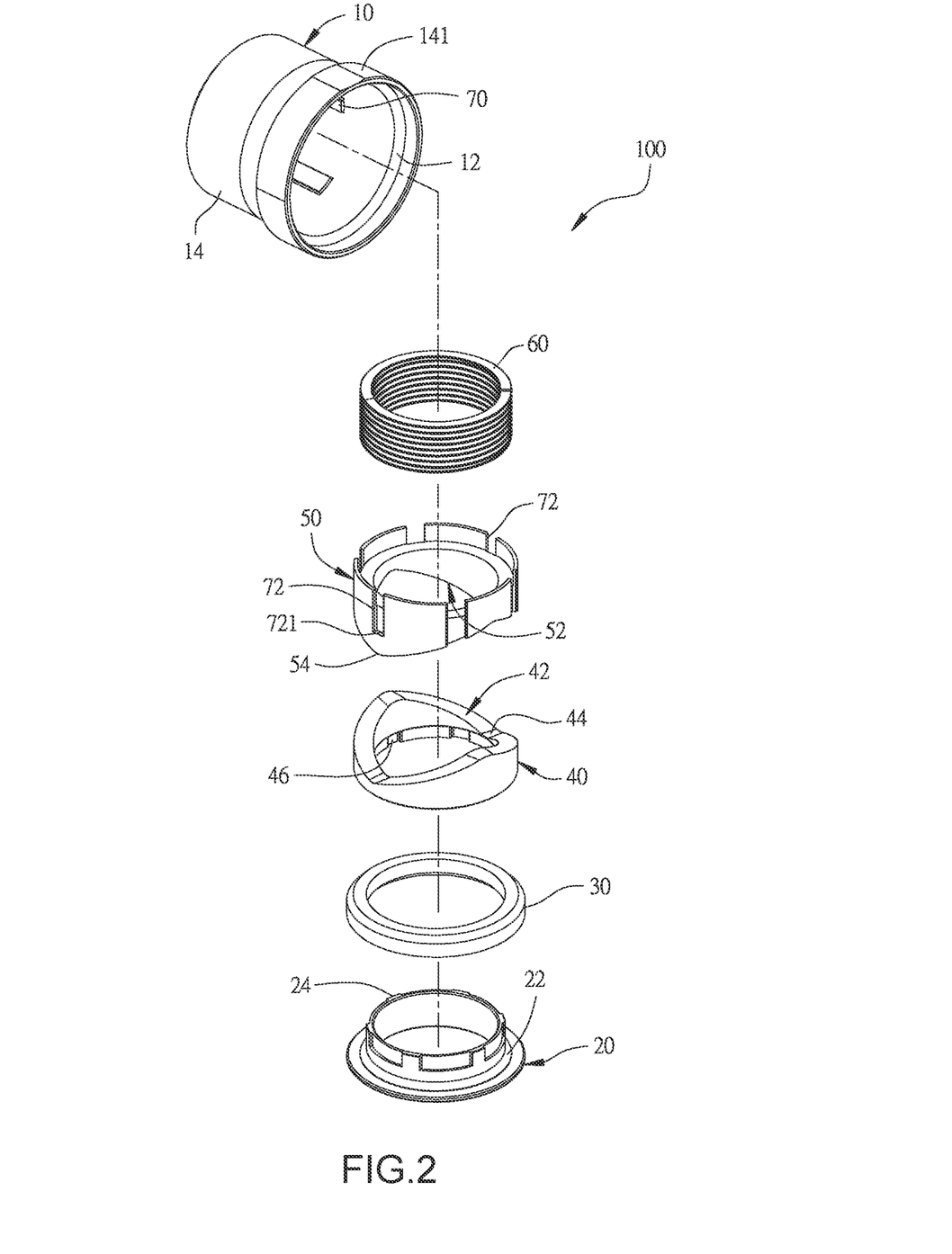
FIG. 2 is an exploded view of the bicycle headset according to the first embodiment of the present disclosure.
Figure 3:
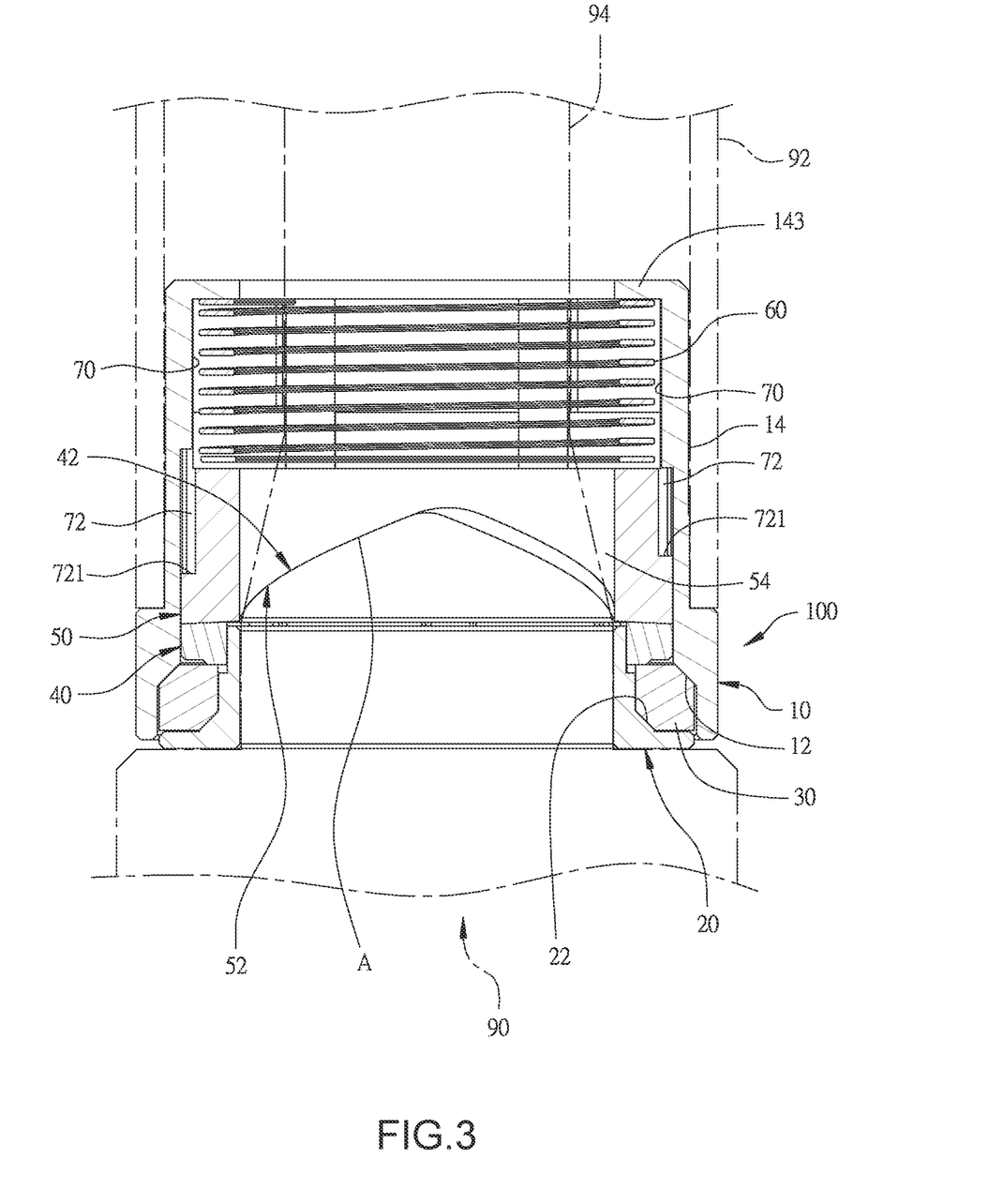
FIG. 3 is a sectional view along the 3-3 line in FIG. 1.

The first casing 10 is adapted to be engaged with the head tube 92, has an axial direction X coaxial to an axis of the head tube 92, and is disposed with a first abutting surface 12.

The second casing 20 is adapted to be engaged with the fork 94, is disposed in the first casing 10, and has a second abutting surface 22 working with the first abutting surface 12.

Two different side surfaces of the bearing 30 abut against the first abutting surface 12 and the second abutting surface 22, respectively, so that the second casing 20 is rotatable relative to the first casing 10 around the axial direction X.

The first restricting member 40 is connected to the second casing 20 and is rotated along with the rotation of the second casing 20, which is driven by the fork 94, wherein an end surface of the first restricting member 40 away from the second casing 20 in the axial direction X has a first restricting surface 42. In the current embodiment, the first restricting surface 42 has at least one recess 44.

The second restricting member 50 is connected to the first casing 10, wherein an end surface of the second restricting member 50 away from the first casing 10 in the axial direction X has a second restricting surface 52. In the current embodiment, the second restricting surface 52 has at least one projection 54 matching with the at least one recess 44. In other embodiments, the at least one recess 44 could be provided on the second restricting surface 52, while the at least one projection 54 matching with the at least one recess 44 could be provided on the first restricting surface 42.

The elastic member 60 abuts between the first casing 10 and the second restricting member 50, thereby providing a force in the axial direction X for urging the second restricting member 50 to move toward the first restricting member 40, making the first restricting surface 42 abut against the second restricting surface 52.

Figure 4:
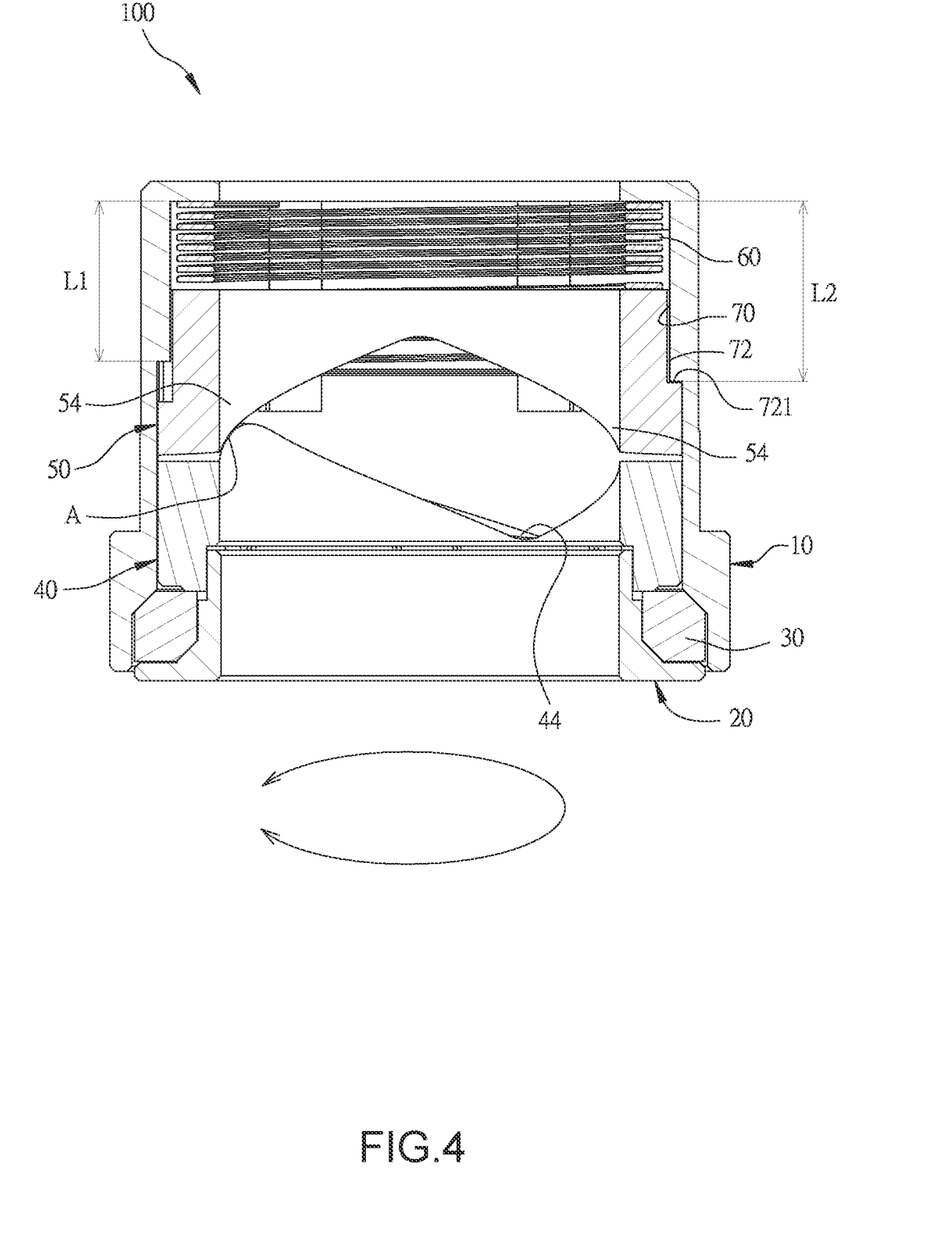
FIG. 4 is a schematic view of FIG. 3, showing the second casing and the first restricting member are rotated.

Referring to FIG. 1, FIG. 3, and FIG. 4, when the fork 94 drives the second casing 20 and the first restricting member 40 connected to the second casing 20 to rotate, the at least one projection 54 and the at least one recess 44 are misaligned due to the rotation as the first restricting surface 42 abuts against the second restricting surface 52. At the time, the second restricting member 50 moves away from the first restricting member 40 in the axial direction X and compresses the elastic member 60. Then, the elastic member 60 provides the force in the axial direction X for urging the second restricting member 50 to move toward the first restricting member 40 in the axial direction X, thereby returning the at least one projection 54 to be aligned with the at least one recess 44 and making the second restricting member 50 get close to the first restricting member 40 in the axial direction X. In this way, the first restricting member 40, the second casing 20, and the fork 94 could steer back due to the force in the axial direction X after being rotated, so that the fork 94 could steer back after being rotated.

As shown in FIG. 1 to FIG. 6, the first casing 10 has a longitudinal tube 14, a bearing bracket 141, and a shoulder portion 142 connected to the longitudinal tube 14 and the bearing bracket 141. An outer diameter of the longitudinal tube 14 is smaller than an outer diameter of the bearing bracket 141. An elastic flange 143 is formed by protruding inward along a radial direction of the longitudinal tube 14 from an edge of an end of the longitudinal tube 14 away from the bearing bracket 141 in the axial direction X. The elastic member 60 abuts between the elastic flange 143 of the first casing 10 and the second restricting member 50. The first abutting surface 12 is an annular incline and is formed on an inner wall of the bearing bracket 141. The bearing 30 is disposed in the bearing bracket 141, wherein an outer lateral surface of the bearing 30 abuts against the first abutting surface 12. When the first casing 10 is engaged with the head tube 92, the longitudinal tube 14 enters the head tube 92 and the shoulder portion 142 abuts against an edge of an end of the head tube 92 for positioning. Therefore, at least a portion of the first restricting member 40 and at least a portion of the second restricting member 50 extend into the head tube 92 in axial direction X, and at least a portion of the first restricting surface 42 and/or at least a portion of the second restricting surface 52 extend into the head tube 92 in the axial direction X.

The second casing 20 is annular and is disposed on an inside of the bearing 30. The second abutting surface 22 is formed on a bottom portion of an outer lateral surface of the second casing 20. An end portion of the second casing 20 close to the first casing 10 in the axial direction X protrudes out of the bearing 30 and has a first concave-convex structure 24. An end portion of the first restricting member 40 facing the second casing 20 has a second concave-convex structure 46. When the second concave-convex structure 46 is engaged with the first concave-convex structure 24, the first restricting member 40 is connected to the second casing 20. In other embodiments, the second casing 20 and the first restricting member 40 could be integrally formed as a monolithic unit.

In the first embodiment, the number of the at least one projection 54 on the second restricting surface 52 is two, and the number of the at least one recess 44 on the first restricting surface 42 is two, wherein a shape of each of the recesses 44 approximately matches with a shape of one of the projections 54, and each of the recesses 44 abuts against one of the projections 54. A portion of each of the recesses 44 abutting against one of the projections 54 is a smooth surface A, so that each of the recesses 44 is engaged with one of the projections 54 through the smooth surface A. A middle of each of the projections 54 is the most protruding in the axial direction X, and a left side and a right side of the middle of each of the projections 54 are gradually declined in the axial direction X. In other embodiments, both the number of the at least one projection 54 and the number of the at least one recess 44 are not limited to be one or two, wherein the first restricting surface 42 could have three or more recesses 44, and the second restricting surface 52 could correspondingly have three or more projections 54.

A wall surface of the first casing 10 corresponding to the second casing 20 and the second restricting member 50 has at least one guiding member 70, for example, two or more guiding members 70, and a wall surface of the second restricting member 50 corresponding to the first casing 10 has at least one guiding track 72, for example, two or more guiding tracks 72. In other embodiments, when the number of the at least one projection 54 is at least two, the at least one guiding track 72 includes at least two guiding tracks 72 respectively disposed in different positions of the second restricting member 50 corresponding to the middle of one of the at least two projections 54.

In the first embodiment, the wall surface of the first casing 10 corresponding to the second casing 20 has two guiding members 70, and the wall surface of the second restricting member 50 corresponding to the first casing 10 has two guiding tracks 72. Each of the guiding tracks 72 slidably works with one of the guiding members 70 in the axial direction X. More specifically, each of the guiding tracks 72 is slidably engaged with one of the guiding members 70 in the axial direction X. An end of each of the guiding tracks 72 close to the second restricting surface 52 in the axial direction X has a closed end 721. Since the closed end 721 of each of the guiding tracks 72 is abutted against by one of the guiding members 70, a moving distance of the second restricting member 50 in the axial direction X could be restricted. Additionally, as the first restricting member 40, the second casing 20, and the fork 94 remain stationary in the axial direction X, restricting the moving distance of the second restricting member 50 in the axial direction X is equivalent to restricting a rotating degree of each of the recesses 44 for being misaligned with one of the projections 54 due to the rotation, so that a rotating degree of a clockwise direction of rotation or an anticlockwise direction of rotation of the fork 94 relative to the head tube 92 could be restricted.

Figure 5:
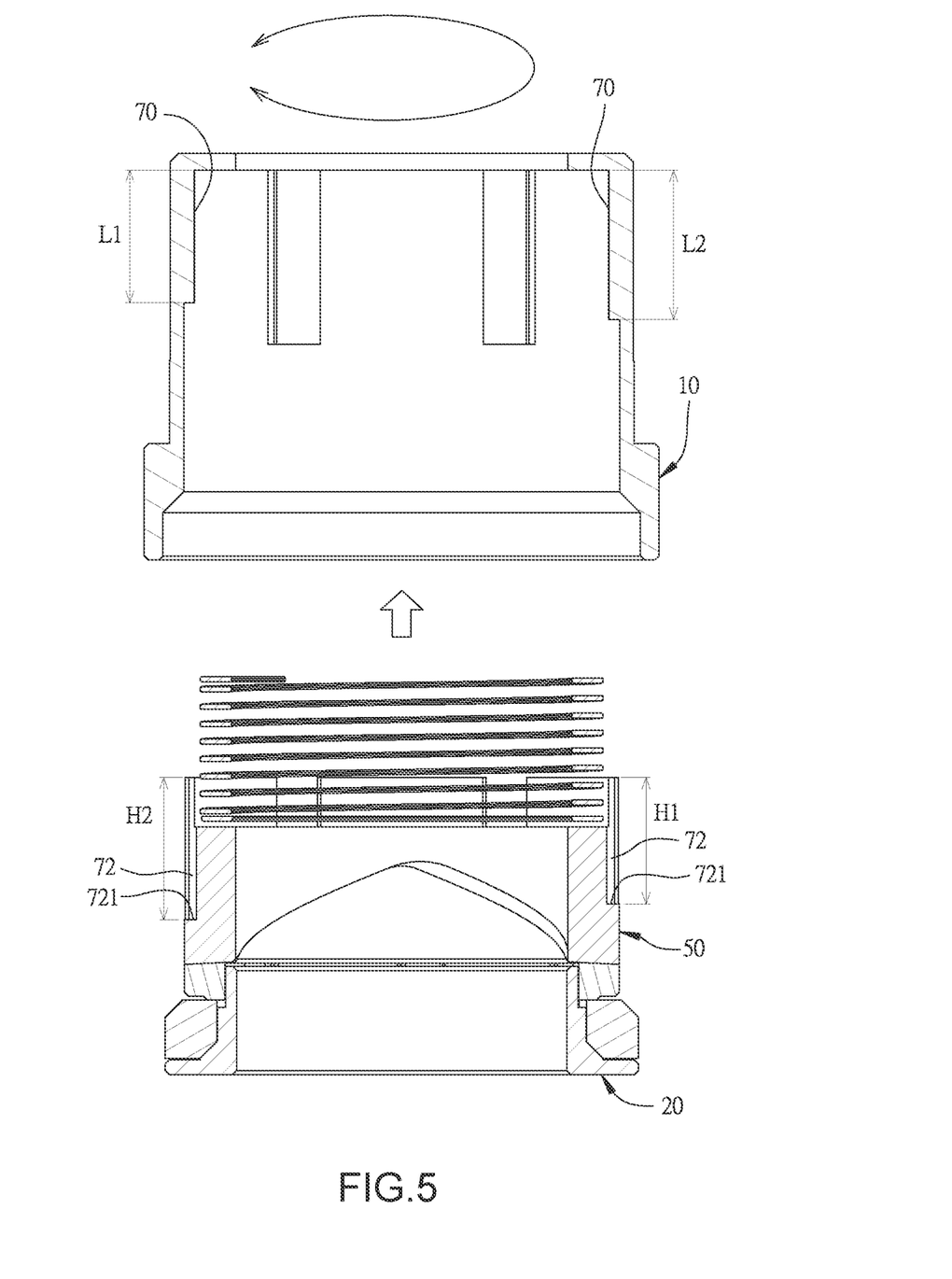
FIG. 5 is another schematic view of FIG. 3, showing the first casing is turned to adjust the angle of the first casing being mounted around the second casing.
Figure 6:
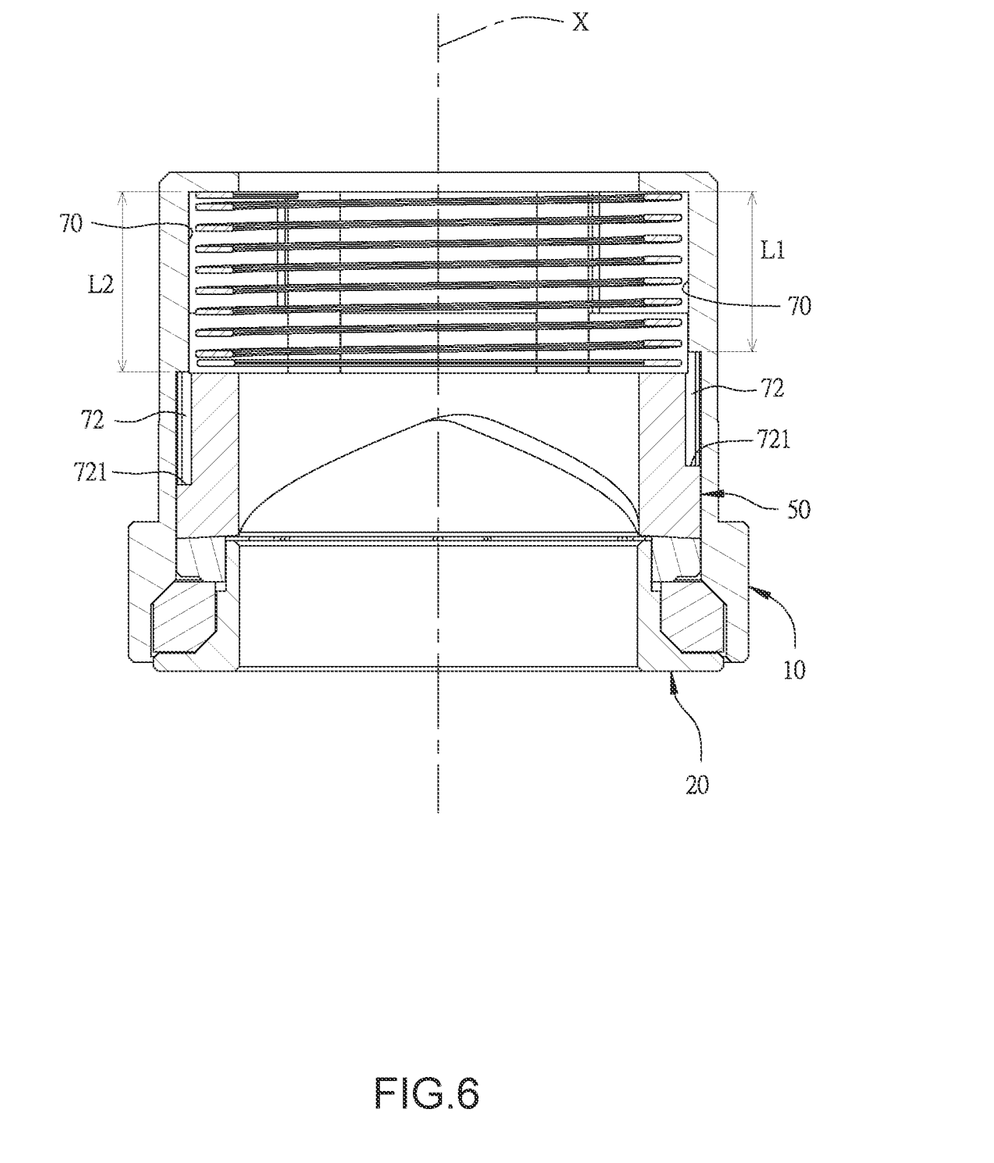
FIG. 6 is still another schematic view of FIG. 3, showing the first casing, which is turned for adjusting the mounting angle, is mounted around the second casing.
Figure 7:
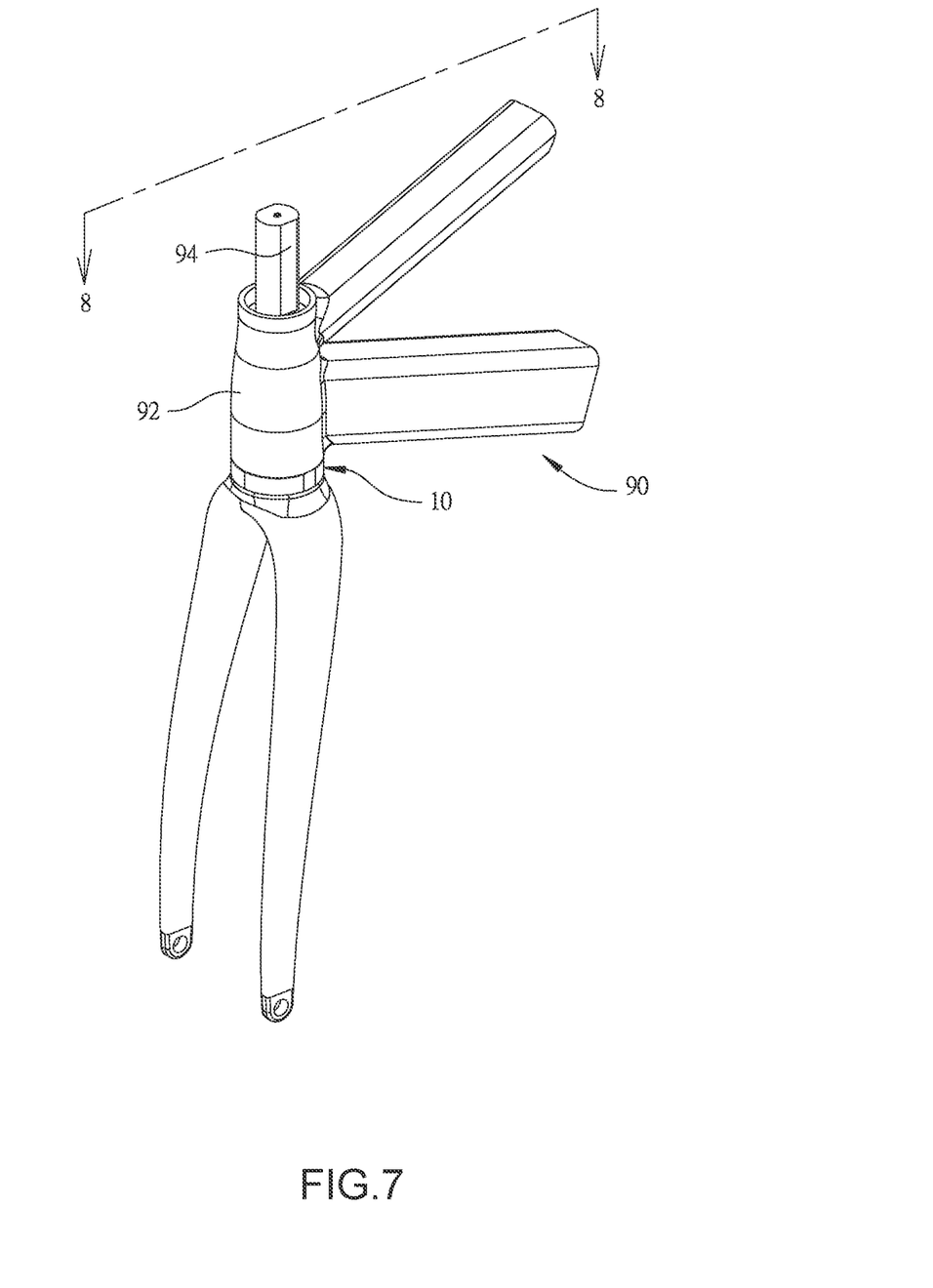
FIG. 7 is another perspective view of the bicycle headset according to the first embodiment of the present disclosure, showing the bicycle headset is mounted on the bicycle.
Figure 8:
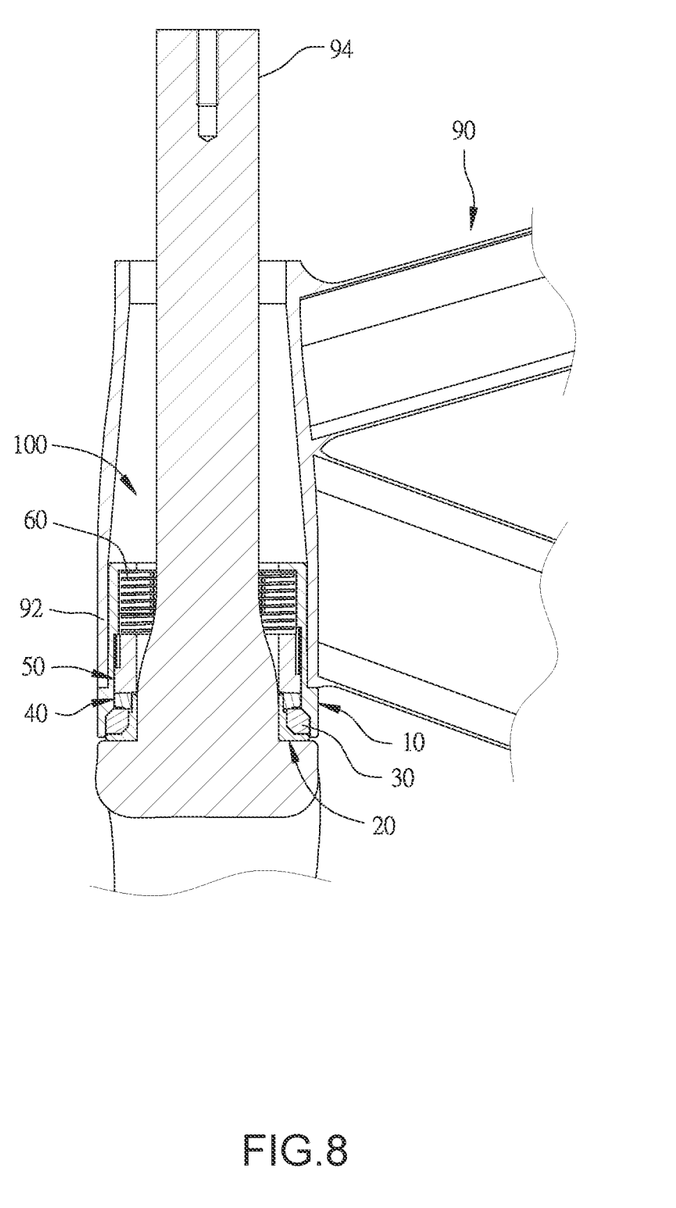
FIG. 8 is a sectional view along the 8-8 line in FIG. 7.
Figure 9:
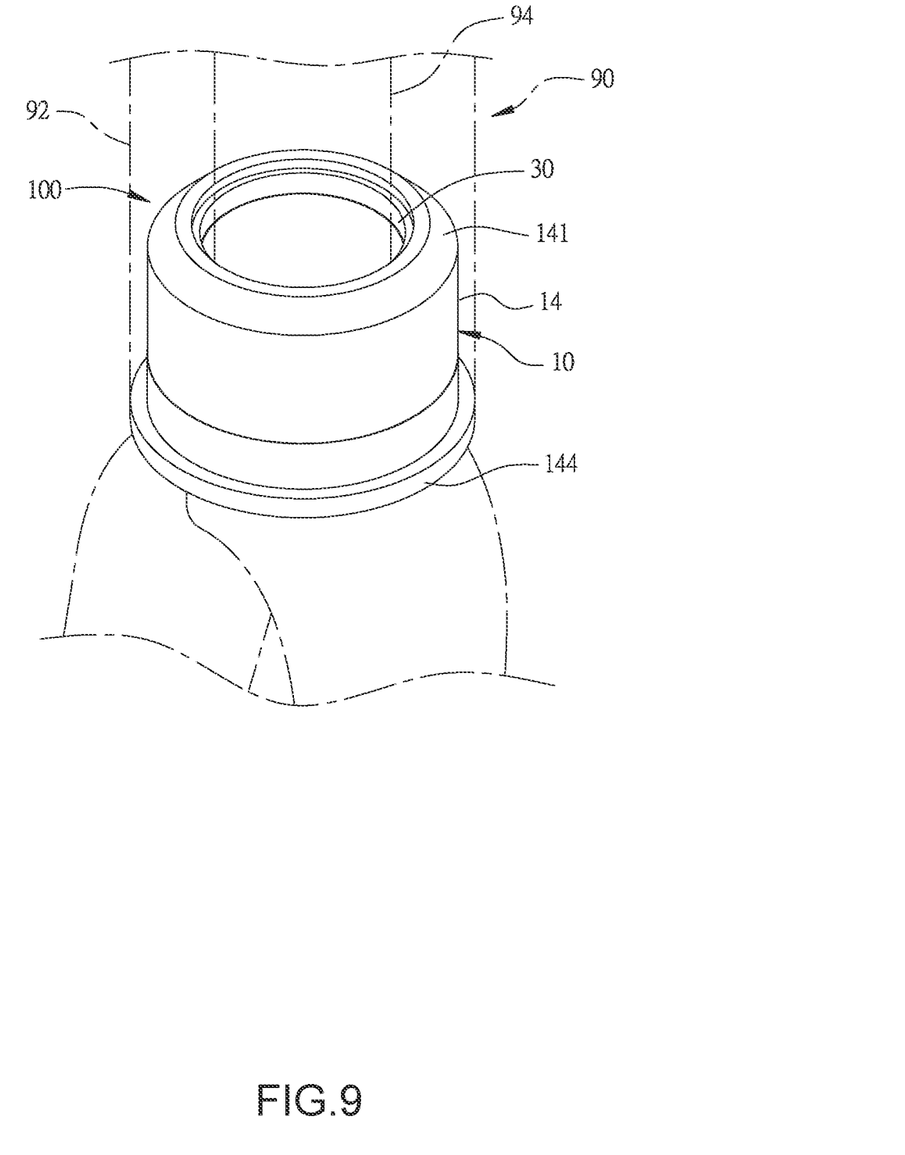
FIG. 9 is a perspective view of the bicycle headset according to a second embodiment of the present disclosure.

In the first embodiment, the two guiding members 70 are respectively located in different positions on the first casing 10, and the two guiding tracks 72 are respectively located in different positions on an outer peripheral surface of the second restricting member 50. More specifically, the two guiding members 70 are respectively located on two opposite sides of the first casing 10 in a circumferential direction perpendicular to the axial direction X, and the two guiding tracks 72 are respectively located on two opposite sides of the outer peripheral surface of the second restricting member 50 in the circumferential direction. As shown in FIG. 4 to FIG. 6, by turning the first casing 10 to adjust an angle of the first casing 10 mounted around the second casing 20, each of the two guiding members 70 could be inserted into one of the two guiding tracks 72 upon the required demand. Additionally, the two guiding members 70 have a first length L1 and a second length L2, respectively, wherein the second length L2 is different from the first length L1 in the axial direction X. The two guiding tracks 72 have a first height H1 and a second height H2, respectively, wherein the second height H2 is different from the first height H1 in the axial direction X. While a position of the closed end 721 of one of the guiding tracks 72 in the axial direction X is different from a position of the closed end 721 of the other guiding track 72 in the axial direction X. Since the two guiding members 70 having two different lengths in the axial direction X work with the two guiding tracks 72 having two different heights in the axial direction X, the moving distance of the second restricting member 50 relative to the first casing 10 in the axial direction X could be selectively adjusted.

In other embodiments, both the number of the at least one guiding member 70 and the number of the at least one guiding track 72 are not limited to be two, wherein the first casing 10 could have three or more guiding members 70 respectively located in different positions on the first casing 10, and the outer peripheral surface of the second restricting member 50 could have three or more guiding tracks 72 respectively located in different positions on the outer peripheral surface of the second restricting member 50. The guiding members 70 are in different lengths in the axial direction X, and the guiding tracks 72 are in different heights in the axial direction X. Thus, when the first casing 10 is mounted around the second casing 20 in different angles to allow at least two of the guiding members 70 hiving the different lengths to work with at least two of the guiding tracks 72 having the different heights, the moving distance of the second restricting member 50 relative to the first casing 10 in the axial direction X could be selectively adjusted. In an embodiment, when both the number of the at least one guiding member 70 and the number of the at least one guiding track 72 are one, the moving distance of the second restricting member 50 relative to the first casing 10 in the axial direction X could be restricted.

A bicycle headset 100 according to a second embodiment of the present disclosure is illustrated in FIG. 9 to FIG. 13 and includes a first casing 10, a second casing 20, a bearing 30, a first restricting member 40, a second restricting member 50, and an elastic member 60.

The first casing 10 is adapted to be engaged with a head tube 92, wherein an axial direction X of the first casing 10 is coaxial to an axis of the head tube 92. The first casing 10 has a first abutting surface 12.

The second casing 20 is adapted to be engaged with a fork 94 and is disposed in the first casing 10. The second casing 20 has a second abutting surface 22 working with the first abutting surface 12.

Two different side surfaces of the bearing 30 abut against the first abutting surface 12 and the second abutting surface 22, respectively, so that the second casing 20 is rotatable relative to the first casing 10 around the axial direction X.

The first restricting member 40 is connected to the second casing 20 and is rotated along with the rotation of the second casing 20 driven by the fork 94. An end surface of the first restricting member 40 away from the second casing 20 in the axial direction X has a first restricting surface 42. In the current embodiment, the first restricting surface 42 has at least one recess 44.

The second restricting member 50 is connected to the first casing 10. An end surface of the second restricting member 50 away from the first casing 10 in the axial direction X has a second restricting surface 52. In the current embodiment, the second restricting surface 52 has at least one projection 54 matching with the at least one recess 44. In other embodiments, the at least one recess 44 could be provided on the second restricting surface 52, while the at least one projection 54 matching with the at least one recess 44 could be provided on the first restricting surface 42

The elastic member 60 abuts between the second casing 20 and the first restricting member 40, thereby providing a force in the axial direction X for urging the first restricting member 40 to move toward the second restricting member 50, making the first restricting surface 42 abut against the second restricting surface 52.

Referring to FIG. 10 to FIG. 13, when the fork 94 drives the second casing 20 and the first restricting member 40 connected to the second casing 20 to rotate, the at least one projection 54 and the at least one recess 44 are misaligned due to the rotation. Since the first restricting surface 42 continuously abuts against the second restricting surface 52, the first restricting member 40 moves away from the second restricting member 50 in the axial direction X and compresses the elastic member 60. Then, the elastic member 60 provides the force in the axial direction X for urging the first restricting member 40 to move toward the second restricting member 50 in the axial direction X. Therefore, after the fork 94 is not rotated, the first restricting member 40 is urged by the elastic member 60 to get close to the second restricting member 50 in the axial direction X to allow the at least one projection 54 to be aligned with the at least one recess 44. In this way, the first restricting member 40, the second casing 20, and the fork 94 could steer back due to the force in the axial direction X provided by the elastic member 60 after being rotated, so that the fork 94 could automatically steer back after being rotated.

As shown in FIG. 9 to FIG. 12, the first casing 10 has a longitudinal tube 14, a bearing bracket 141, and a flange 144. The bearing bracket 141 is connected to an edge of an end of the longitudinal tube 14 away from the second casing 20 in the axial direction X. The flange 144 of the first casing 10 is formed by protruding outward along a radial direction of the longitudinal tube 14 from an edge of an end of the longitudinal tube 14 away from the bearing bracket 141 in the axial direction X. The first abutting surface 12 is an annular incline and is formed on an inner wall of the bearing bracket 141. The bearing 30 is disposed in the bearing bracket 141, wherein an outer lateral surface of the bearing 30 abuts against the first abutting surface 12. When the first casing 10 is engaged with the head tube 92, the longitudinal tube 14 and the bearing bracket 141 are inserted into the head tube 92, and the flange 144 of the first casing 10 abuts against the edge of the end of the head tube 92 for positioning. Therefore, at least a portion of the first restricting member 40 and at least a porting of the second restricting member 50 extend into the head tube 92 in the axial direction X, and at least a portion of the first restricting surface 42 and/or at least a portion of the second restricting surface 52 extend into the head tube 92 in the axial direction X.

The second casing 20 is tubular and is disposed on an inside of the first casing 10. The second abutting surface 22 is formed on a periphery of a top end of the second casing 20. A flange 26 of the second casing 20 protrudes outward from an outer lateral surface of a bottom end of the second casing 20. The elastic member 60 abuts between the flange 26 of the second casing 20 and the first restricting member 40. The first restricting member 40 is disposed around the second casing 20 and is movably connected to the second casing 20, wherein the first restricting member 40 is movable relative to the second casing 20 in the axial direction X. More specifically, in the second embodiment, a sliding track structure B extending in the axial direction X is provided between the second casing 20 and the first restricting member 40, so that the first restricting member 40 is connected to the second casing 20 and is simultaneously rotated as the second casing 20 is rotated, and the first restricting member 40 is movable relative to the second casing 20 in the axial direction X.

Figure 12:
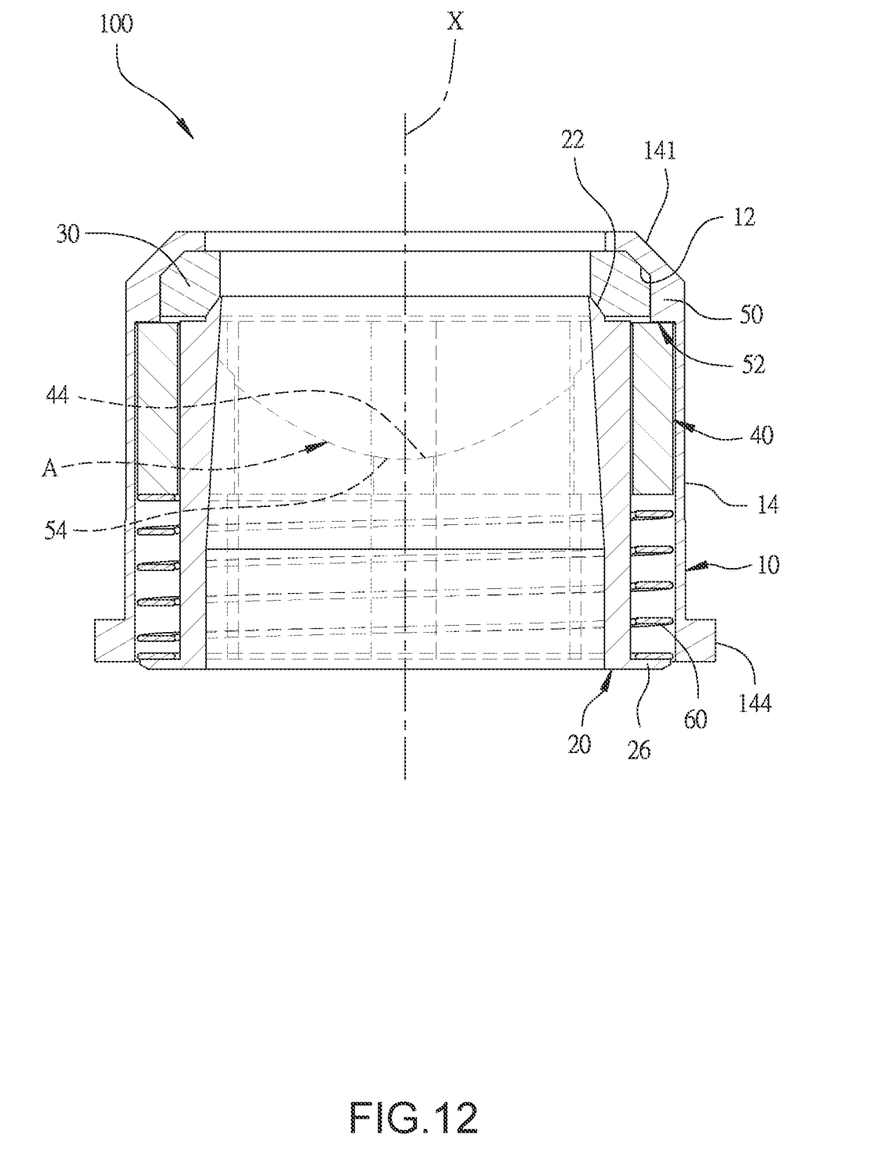
FIG. 12 is a sectional view along the 12-12 line in FIG. 11.
Figure 13:
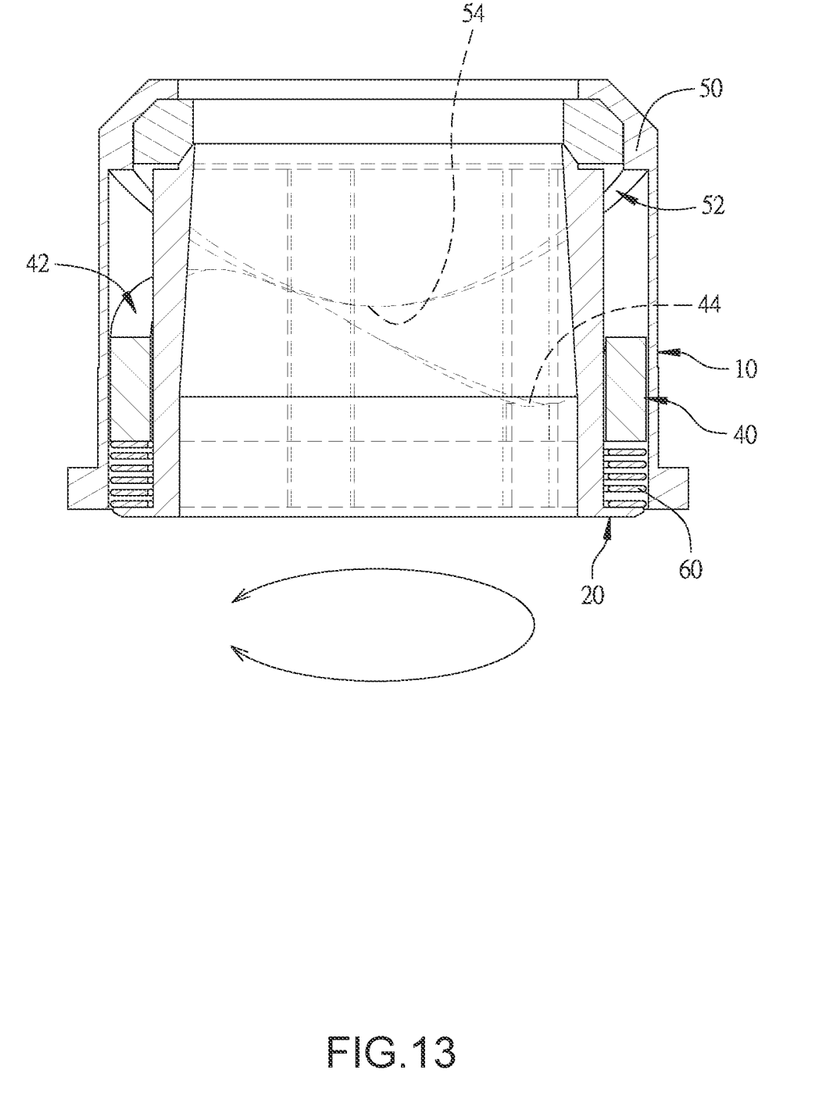
FIG. 13 is a schematic view of FIG. 12, showing the second casing and the first restricting member are rotated.

In the second embodiment, the second restricting member 50 and the first casing 10 are integrally formed as a monolithic unit, wherein the second restricting member 50 is connected to a portion of an inner wall of the first casing 10 adjacent to the bearing bracket 141. In other embodiments, the first casing 10 could have a first concave-convex structure, and the second restricting member 50 could be a ring body, and an end portion of the second restricting member 50 facing the first casing 10 could have a second concave-convex structure, wherein when the second concave-convex structure is engaged with the first concave-convex structure, the second restricting member 50 is connected to the first casing 10.

In the second embodiment, the number of the at least one projection 54 on the second restricting surface 52 is two, and the number of the at least one recess 44 on the first restricting surface 42 is two, wherein a shape of each of the recesses 44 approximately matches with a shape of one of the projections 54, and each of the recesses 44 abuts against one of the projections 54; a portion of each of the recesses 44 abutting against one of the projections 54 is a smooth surface A. In other words, each of the recesses 44 is engaged with one of the projections 54 through the smooth surface A. A middle of each of the projections 54 is the most protruding in the axial direction X, and a left side and a right side of the middle of each of the projections 54 are gradually declined in the axial direction. In other embodiments, both the number of the at least one projection 54 and the number of the at least one recess 44 are not limited to be one or two, wherein the first restricting surface 42 could have three or more recesses 44, and the second restricting surface 52 could correspondingly have three or more projections 54.

Figure 10:
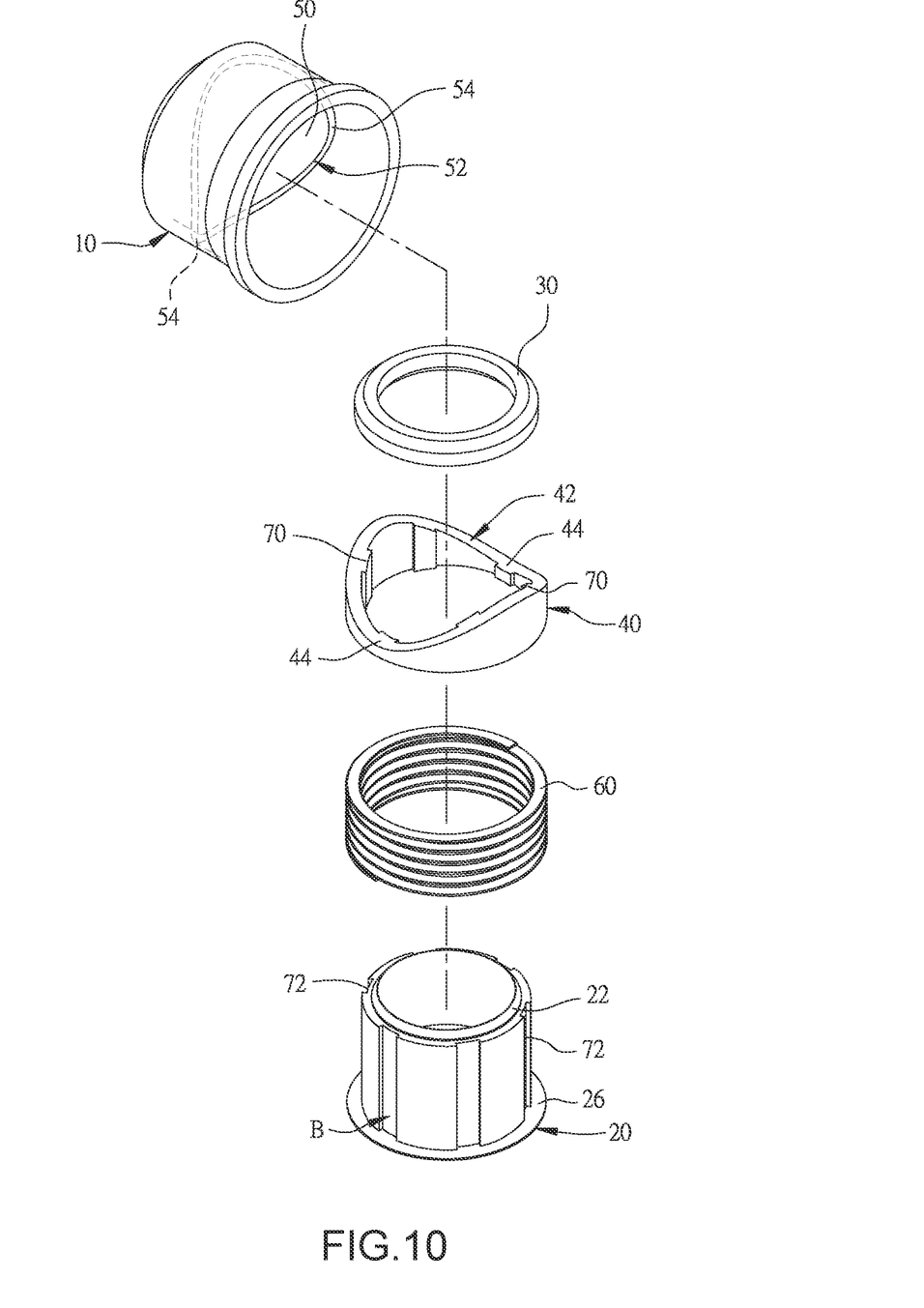
FIG. 10 is an exploded view of the bicycle headset according to the second embodiment of the present disclosure.
Figure 11:
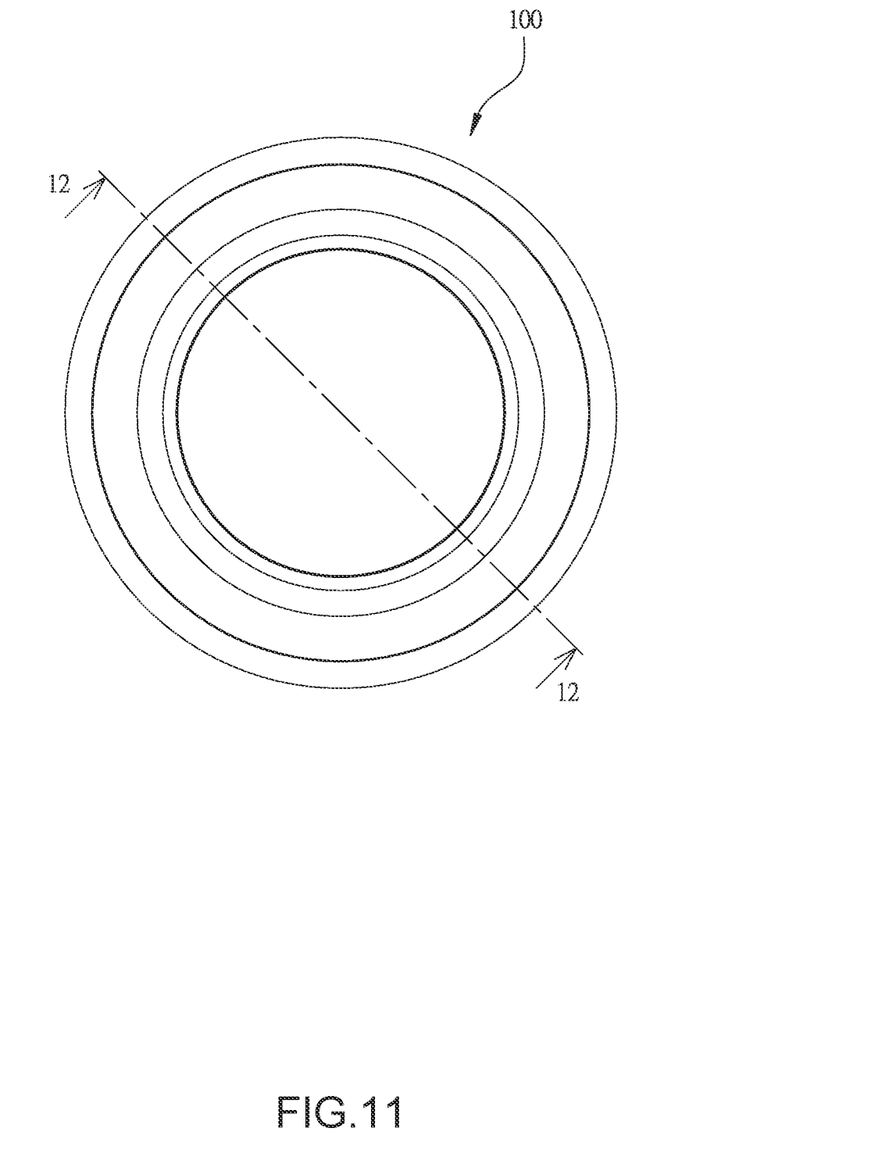
FIG. 11 is a top view of FIG. 9.

In the second embodiment, a wall surface of the second casing 20 corresponding to the first restricting member 40 has at least one guiding track 72, for example, two or more guiding tracks 72, and a wall surface of the first restricting member 40 corresponding to the second casing 20 has at least one guiding member 70, for example, two or more guiding members 70.

In the second embodiment, the wall surface of the second casing 20 corresponding to the first restricting member 40 has two guiding tracks 72, and the wall surface of the first restricting member 40 corresponding to the second casing 20 has two guiding members 70. Each of the guiding members 70 slidably works with one of the guiding tracks 72 in the axial direction X. More specifically, each of the guiding tracks 72 is slidably engaged with one of the guiding members 70 in the axial direction X. The two guiding tracks 72 are respectively located in different positions on the second casing 20, and the two guiding members 70 are respectively located in different positions on an inner peripheral surface of the first restricting member 40. More specifically, the two guiding tracks 72 are respectively located on two opposite sides of the second casing 20 in a circumferential direction perpendicular to the axial direction X, and the two guiding members 70 are respectively located on two opposite sides of the first restricting member 40 in the circumferential direction. In other embodiments, both the number of the at least one guiding track 72 and the number of the at least one guiding member 70 are not limited to be two, wherein the second casing 20 could have three or more guiding tracks 72 respectively located in different positions of the second casing 20, and the inner peripheral surface of the first restricting member 40 could have three or more guiding members 70 respectively located in different positions on the inner peripheral surface of the first restricting member 40.

In other embodiments, an end of each of the guiding tracks 72 away from the first restricting surface 42 in the axial direction X has a closed end 721. A length of each of the guiding members 70 in the axial direction X is shorter than a length of each of the guiding tracks 72 in the axial direction X in the second embodiment. In this way, When the closed end of each of the guiding tracks 72 is abutted against by one of the guiding members 70, a moving distance of the first restricting member 40 in the axial direction X could be restricted, so that a rotating degree of each of the recesses 44 relative to one of the projections 54 could be restricted, thereby restricting a rotating degree of a clockwise direction of rotation or an anticlockwise direction of rotation of the fork 94 relative to the head tube 92. Since the guiding members 70 have different lengths in the axial direction X and the guiding tracks 72 have different heights in the axial direction X, the first restricting member 40 could be mounted around the second casing 20 in different angles to allow at least two of the guiding members 70 having different lengths in the axial direction X to be movably engaged with at least two of the guiding tracks 72 having different heights in the axial direction X, thereby selectively adjusting the moving distance that the first restricting member 40 could be moved relative to the second casing 20 in the axial direction X. The design concept of the guiding tracks 72 and the guiding members 70 could refer to FIG. 4 to FIG. 6.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A bicycle headset, comprising:
    a first casing adapted to be engaged with a head tube of a bicycle, having an axial direction, and disposed with a first abutting surface;
    a second casing adapted to be engaged with a fork of a bicycle and having a second abutting surface;
    a bearing, wherein two different side surfaces of the bearing abut against the first abutting surface and the second abutting surface, respectively;
    a first restricting member connected to the second casing and rotated as the second casing is rotated; wherein an end surface of the first restricting member away from the second casing in the axial direction has a first restricting surface;
    a second restricting member connected to the first casing, wherein an end surface of the second restricting member away from the first casing in the axial direction has a second restricting surface; either the second restricting member or the first restricting member is movable in the axial direction for moving away from or toward the other; and
    an elastic member abutting between the first casing and the second restricting member or between the second casing and the first restricting member; thereby providing a force in the axial direction for urging either the first restricting member or the second restricting member to move toward the other, making the first restricting surface abut against the second restricting surface;
    wherein either the first restricting surface or the second restricting surface has at least one projection, and the other correspondingly has at least one recess matching with the at least one projection;
    wherein when the elastic member abuts between the first casing and the second restricting member, a wall surface of the first casing corresponding to the second restricting member has at least one guiding member, and a wall surface of the second restricting member corresponding to the first casing has at least one guiding track; the at least one guiding track slidably works with the at least one guiding member in the axial direction; an end of the at least one guiding track close to the second restricting surface in the axial direction has a closed end; since the closed end of the at least one guiding track is abutted against by the at least one guiding member, a moving distance of the second restricting member in the axial direction is restricted.

2. The bicycle headset as claimed in claim 1, wherein the at least one guiding member comprises at least two guiding members respectively located in different positions on the first casing, and the at least one guiding track comprises at least two guiding tracks respectively located in different positions on an outer peripheral surface of the second restricting member.

3. The bicycle headset as claimed in claim 2, wherein each of the at least two guiding members has a different length in the axial direction, and each of the at least two guiding tracks has a different height in the axial direction; since the at least two guiding members having different lengths work with the at least two guiding tracks having different heights, the moving distance of the second restricting member relative to the first casing in the axial direction is selectively adjusted.

4. The bicycle headset as claimed in claim 3, wherein the at least one projection comprises at least two projections on the second restricting surface, and the at least one recess comprises at least two recesses on the first restricting surface; a shape of each of the at least two projections approximately matches with a shape of one of the at least two recesses, and each of the at least two projections abuts against one of the at least two recesses; each of the at least two projections is engaged with one of the at least two recesses through a smooth surface.

5. The bicycle headset as claimed in claim 4, wherein a middle of each of the at least two projections is the most protruding in the axial direction, and a left side and a right side of the middle of each of the at least two projections are gradually declined in the axial direction; each of the at least two guiding tracks is disposed in a position of the second restricting member corresponding to the middle of one of the at least two projections.

6. The bicycle headset as claimed in claim 1, wherein the second casing has a first concave-convex structure, and an end portion of the first restricting member facing the second casing has a second concave-convex structure; when the second concave-convex structure is engaged with the first concave-convex structure, the first restricting member is connected to the second casing.

7. The bicycle headset as claimed in claim 1, wherein the second casing and the first restricting member are integrally formed as a monolithic unit.

8. The bicycle headset as claimed in claim 1, wherein either at least a portion of the first restricting surface or at least a portion of the second restricting surface extends into the head tube in the axial direction.

9. A bicycle headset, comprising:
    a first casing adapted to be engaged with a head tube of a bicycle, having an axial direction, and disposed with a first abutting surface;
    a second casing adapted to be engaged with a fork of a bicycle and having a second abutting surface;
    a bearing, wherein two different side surfaces of the bearing abut against the first abutting surface and the second abutting surface, respectively;
    a first restricting member connected to the second casing and rotated as the second casing is rotated; wherein an end surface of the first restricting member away from the second casing in the axial direction has a first restricting surface;
    a second restricting member connected to the first casing, wherein an end surface of the second restricting member away from the first casing in the axial direction has a second restricting surface; either the second restricting member or the first restricting member is movable in the axial direction for moving away from or toward the other; and
    an elastic member abutting between the first casing and the second restricting member or between the second casing and the first restricting member; thereby providing a force in the axial direction for urging either the first restricting member or the second restricting member to move toward the other, making the first restricting surface abut against the second restricting surface;

wherein either the first restricting surface or the second restricting surface has at least one projection, and the other correspondingly has at least one recess matching with the at least one projection;

wherein when the elastic member abuts between the second casing and the first restricting member, a wall surface of the second casing corresponding to the first restricting member has at least one guiding track, and a wall surface of the first restricting member corresponding to the second casing has at least one guiding member; the at least one guiding member slidably works with the at least one guiding track in the axial direction; an end of the at least one guiding track away from the first restricting surface has a closed end; when the closed end of the at least one guiding track is abutted against by the at least one guiding member, a moving distance of the first restricting member in the axial direction is restricted.

10. The bicycle headset as claimed in claim 9, wherein the at least one guiding track comprises at least two guiding tracks respectively located in different positions on the second casing, and the at least one guiding member comprises at least two guiding members respectively located in different positions on the first restricting member.

11. The bicycle headset as claimed in claim 10, wherein each of the at least two guiding tracks has a different height in the axial direction, and each of the at least two guiding members has a different length in the axial direction; since the at least two guiding members having different lengths work with the at least two guiding tracks having different heights, the moving distance of the first restricting member relative to the second casing in the axial direction is selectively adjusted.

12. The bicycle headset as claimed in claim 11, wherein the at least one projection comprises at least two projections on the first restricting surface, and the at least one recess comprises at least two recesses on the second restricting surface; a shape of each of the at least two projections approximately matches with a shape of one of the at least two recesses, and each of the at least two projections abuts against one of the at least two recesses; each of the at least two projections is engaged with one of the at least two recesses through a smooth surface.

13. The bicycle headset as claimed in claim 12, wherein a middle of each of the at least two projections is the most protruding in the axial direction, and a left side and a right side of the middle of each of the at least two projections are gradually declined in the axial direction.

14. The bicycle headset as claimed in claim 9, wherein the first casing has a first concave-convex structure, and an end portion of the second restricting member facing the first casing has a second concave-convex structure; when the second concave-convex structure is engaged with the first concave-convex structure, the second restricting member is connected to the first casing.

15. The bicycle headset as claimed in claim 9, wherein the first casing and the second restricting member are integrally formed as a monolithic unit.

16. The bicycle headset as claimed in claim 9, wherein either at least a portion of the first restricting surface or at least a portion of the second restricting surface extends into the head tube in the axial direction.

* * * * *